US009210011B2

(12) United States Patent
Rinaldi et al.

(10) Patent No.: US 9,210,011 B2
(45) Date of Patent: Dec. 8, 2015

(54) PUSH-PULL SOURCE-SERIES TERMINATED TRANSMITTER APPARATUS AND METHOD

(75) Inventors: Giacomo Rinaldi, Lake Oswego, OR (US); Stefano Giaconi, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/996,534

(22) PCT Filed: Sep. 23, 2011

(86) PCT No.: PCT/US2011/053140
§ 371 (c)(1),
(2), (4) Date: Jun. 20, 2013

(87) PCT Pub. No.: WO2013/043198
PCT Pub. Date: Mar. 28, 2013

(65) Prior Publication Data
US 2013/0287085 A1    Oct. 31, 2013

(51) Int. Cl.
| H03B 1/00 | (2006.01) |
| H03K 3/00 | (2006.01) |
| H04L 25/03 | (2006.01) |
| H04L 25/02 | (2006.01) |

(52) U.S. Cl.
CPC ........ *H04L 25/03878* (2013.01); *H04L 25/028* (2013.01)

(58) Field of Classification Search
CPC ............................................... H04L 25/03878
USPC ........................................ 327/408–410, 108
See application file for complete search history.

(56) References Cited

U.S. PATENT DOCUMENTS

| 6,704,818 | B1 | 3/2004 | Martin et al. |
| 7,034,574 | B1 | 4/2006 | Li |
| 7,961,008 | B2 * | 6/2011 | Kim et al. ........................ 326/87 |
| 2008/0218292 | A1 * | 9/2008 | Park et al. ..................... 333/103 |
| 2009/0160495 | A1 | 6/2009 | Chen et al. |
| 2009/0195288 | A1 | 8/2009 | Chao et al. |

(Continued)

FOREIGN PATENT DOCUMENTS

| EP | 322025 A2 * | 6/1989 | ........... H03K 17/687 |
| EP | 2169889 A1 * | 3/2010 | ............. H04L 25/02 |
| JP | 200022516 A | 1/2000 | |

OTHER PUBLICATIONS

International Search Report and Written Opinion for PCT/US2011/053140, mailed Apr. 24, 2012, 10 pages.

(Continued)

*Primary Examiner* — Sibin Chen
*Assistant Examiner* — Metasebia Retebo
(74) *Attorney, Agent, or Firm* — Schwabe, Williamson & Wyatt, P.C.

(57) ABSTRACT

A transmitter, such as a voltage mode driver (VMD)-based push-pull source-series terminated (SST) transmitter, is provided that can consume less current as the amplitude of a voltage output is decreased. The transmitter includes a transmitter circuit having a first branch and a second branch. While the first branch is activated to send an analog output signal, the second branch is deactivated, and vice versa. One or more bit values of an input binary signal can be used to selectively activate and deactivate the first and second branches.

21 Claims, 5 Drawing Sheets

(56) References Cited

U.S. PATENT DOCUMENTS

2010/0025826 A1 2/2010 Faul et al.
2011/0261041 A1* 10/2011 Cheng .......................... 345/208

OTHER PUBLICATIONS

International Preliminary Report on Patentability for PCT Application No. PCT/US2011/053140, dated Apr. 3, 2014 (10 pages).
TW Search Report for TW Application No. 101132497, dated Sep. 24, 2014, 2 pages.
Office Action dated Sep. 24, 2014 for Taiwan Application No. 101145662, 5 pages.
JP Office Action for JP Application No. 2014-531778, dated Mar. 10, 2015, 4 pages.
Office Action Mailed Sep. 28, 2015 for German Application No. 11.2011105648.6, 13 pages.

* cited by examiner

PUSH-PULL SOURCE-SERIES TERMINATED TRANSMITTER APPARATUS AND METHOD

CROSS REFERENCE TO RELATED APPLICATION

The present application is a national phase entry under 35 U.S.C. §371 of International Application No. PCT/US2011/053140, filed Sep. 23, 2011, entitled "PUSH-PULL SOURCE-SERIES TERMINATED TRANSMITTER APPARATUS AND METHOD," which designates, among the various States, the United States of America, and the entire contents and disclosures of which are hereby incorporated by reference in their entireties.

TECHNICAL FIELD

This disclosure relates generally to electronic circuits. More particularly but not exclusively, the present disclosure relates to a transmitter circuit.

BACKGROUND INFORMATION

Multi-gigabit transmitters are widely used in today's serial links, such as with Serial Advanced Technology Attachment (SATA) and Peripheral Component Interconnect Express (PCIe) communication links. Two classes of such types of transmitters are commonly used: Current Mode Driver (CMD)-based and Voltage Mode Driver (VMD)-based transmitters. One reason for using a VMD-based transmitter versus a CMD-based transmitter is the smaller amount of current needed to produce the same voltage amplitude across a termination resistor Rrx at a receiver. The smaller amount of current translates into lower power consumption at the VMD-based transmitter.

A disadvantage of a VMD-based transmitter for some serial link families is the single-ended maximum output voltage level that is achievable, which is generally limited to half the power supply ($\frac{1}{2}$*VCC). In the majority of high speed serial links, the signal is transmitted in a differential manner—this condition translates to a theoretical maximum peak-to-peak differential output amplitude voltage of VCC. This reduced voltage level may become a limiting factor in a situation where the signal is transmitted through a transmission channel that introduces high losses and/or distortion.

Nowadays, high-speed transmitters utilize equalization techniques to compensate for the high losses and frequency domain characteristic of a transmission channel. The equalization compensates for degradation and distortion of the signal as it travels through the transmission channel, such that the receiver is able to receive a sufficiently usable signal. In order to produce equalized signals, various techniques can be used in the analog domain as well as the digital domain.

One of the most power-efficient of such techniques is to use a digital-to-analog converter (DAC) to produce the various output voltage levels required to equalize a signal. Source-series terminated (SST) transmitters are a commonly used example of a VMD-based transmitter that can achieve lower power consumption relative to a CMD-based transmitter.

An SST transmitter typically includes two circuit branches (each having resistors R1 and R2) coupled to VCC and through which the signal is transmitted in a differential manner as part of the DAC process. A disadvantage of this implementation is that there are always currents flowing in the two circuit branches from VCC to ground, regardless of the output voltage produced. Using an N-bit DAC, the lower the output voltage produced, the higher the current lost in the two branches. For example, to produce a $\frac{1}{2}$*VCC output voltage level, the values of the resistors in the two branches may be R1=50 ohms and R2=infinity/high, thereby resulting in a current of 5 mA assuming the receiver's termination resistor Rrx=100 ohms and VCC=1V. Producing instead a significantly lower output voltage of $\frac{1}{31}$*VCC, for example, involves R1=1550/16 ohms and R2=1550/15, such that R1//R2=100 ohms. However, this reduced value of output voltage translates to a higher total current consumption of 9.579 mA.

Accordingly, it is therefore evident that the current consumption corresponding to an equalized output voltage has an inverse relationship to the amplitude of the output voltage. The lesser the amplitude of the output voltage, the higher the amount of current needed to produce the output voltage. This higher current disadvantageously results in increased power consumption, especially in applications that typically involve lower voltages.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
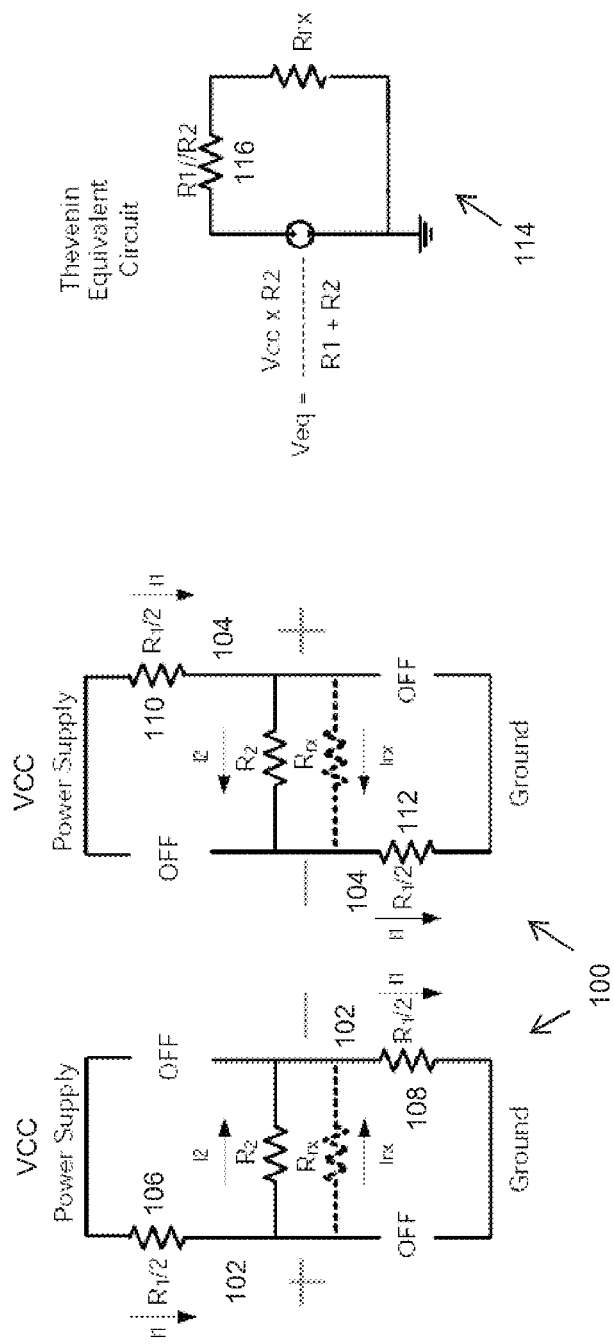
FIG. 1 illustrates representations of a transmitter circuit in accordance with one embodiment.

Embodiments of a transmitter circuit that consumes less current are described herein. In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One embodiment provides a transmitter, such as a voltage mode driver (VMD)-based push-pull source-series terminated (SST) transmitter that can consume less current as the amplitude of a voltage output of the transmitter is decreased. The transmitter includes a transmitter circuit having a first branch and a second branch. While the first branch is activated to send an analog output signal, the second branch is deactivated, and vice versa. One or more bit values of an input binary signal can be used to selectively activate and deactivate the first and second branches.

A feature of one embodiment of this transmitter circuit is the intrinsic current savings while transmitting lower output (lower voltage) amplitude. This feature can be used, in one embodiment, in serial link implementations to optimize the power budget in a link where full amplitude is not required or not allowed, for example in a PCIe transmission using a half-amplitude mode at various times. In addition, the feature of lower current consumption can be utilized for multi-protocol and reuse designs, since the exact same transmitter can be designed for the highest-power case but still be used for other cases without suffering a power penalty.

According to one embodiment, an apparatus is provided that has a transmitter circuit that includes a first branch and a second branch; wherein the first branch is activated to send an output analog signal while the second branch is inactivated, and wherein the second branch is activated to send the output analog signal while the first branch is inactivated; and wherein selection of the first branch or the second branch to activate to send the output analog signal is based on values of bits of an input binary signal received by the transmitter circuit.

According to one embodiment of the apparatus, the transmitter circuit includes a voltage mode driver (VMD)-based push-pull source-series terminated transmitter.

According to one embodiment of the apparatus, the first branch includes a first resistance provided by a turn-ON resistance of a first transistor, a first resistor coupled to the first transistor, a turn-ON resistance of a second transistor, a second resistor coupled to the second transistor, and further includes a second resistance provided by at least one circuit element coupled to the first and second resistors.

According to one embodiment of the apparatus, the second branch includes the first resistance provided by a turn-ON resistance of a third transistor, a third resistor coupled to the third transistor, a turn-ON resistance of a fourth transistor, and a fourth resistor coupled to the fourth transistor.

According to one embodiment of the apparatus, the second branch further includes the second resistance provided by the at least one circuit element, which is also coupled to the third and fourth resistors.

According to one embodiment of the apparatus, a level of the output analog signal is based on the first resistance and the second resistance.

According to one embodiment of the apparatus, each of the first, second, third and fourth transistors include a control terminal to receive a control signal to activate or deactivate the respective first, second, third and fourth transistors, and wherein the control signal has a value based on the values of the bits of the input binary signal.

According to one embodiment of the apparatus, the first and the third transistors include P-type metal oxide semiconductor transistors, and wherein the second and fourth transistors include N-type metal oxide semiconductor transistors.

According to one embodiment of the apparatus, the at least one circuit element includes at least one resistor coupled to at least one transistor, and wherein the at least one transistor includes a control terminal to receive a control signal to activate or deactivate the at least one transistor, and wherein the control signal has a value based on a relationship between control signals provided to control terminals of the first, second, third, and fourth transistors.

According to one embodiment of the apparatus, the selection of the first branch or the second branch to activate is based on a polarity of the input binary signal, and wherein the polarity is indicated by at least one bit value of the input binary signal.

According to one embodiment, the apparatus further includes a plurality of cells, wherein each of the cells includes a version of the transmitter circuit, wherein each version of the transmitter circuit includes first and second branches with resistance values, and wherein the resistance values in the cells collectively contribute to determine a level of the output analog signal.

According to one embodiment of the apparatus, at least one leg of the first branch shares a resistor with at least one leg of the second branch.

According to another embodiment, a method is provided that includes receiving, by a transmitter circuit, an input binary signal; activating a first branch of the transmitter circuit to send an output analog signal while a second branch of the transmitter circuit is deactivated; and activating a second branch of the transmitter circuit to send the output analog signal while the first branch of the transmitter circuit is deactivated; wherein selection of the first branch or the second branch to activate to send the output analog signal is based on values of bits of the input binary signal received by the transmitter circuit.

According to one embodiment, the method further includes producing a level of the output analog signal according to first and second resistances in the first branch and the second branch, wherein: the first branch includes the first resistance provided by a turn-ON resistance of a first transistor, a first resistor coupled to the first transistor, a turn-ON resistance of a second transistor, a second resistor coupled to the second transistor, and further includes the second resistance provided by at least one circuit element coupled to the first and second resistors; and the second branch includes the first resistance provided by a turn-ON resistance of a third transistor, a third resistor coupled to the third transistor, a turn-ON resistance of a fourth transistor, a fourth resistor coupled to the fourth transistor, and further includes the second resistance provided by the at least one circuit element, which is also coupled to the third and fourth resistors.

According to one embodiment, the method further includes providing a control signal to each of the first, second, third and fourth transistors to activate or deactivate the respective first, second, third and fourth transistors, wherein the control signal has a value based on the values of the bits of the input binary signal.

According to one embodiment of the method, the at least one circuit element includes at least one resistor coupled to at least one transistor, the method further comprising providing a control signal to the at least one transistor to activate or deactivate the at least one transistor, wherein the control signal has a value based on a relationship between control signals provided to the first, second, third, and fourth transistors.

According to one embodiment of the method, the selection of the first branch or the second branch to activate is based on a polarity of the input binary signal, and wherein the polarity is indicated by at least one bit value of the input binary signal.

According to one embodiment of the method, a version of the transmitter circuit is provided in each of a plurality of cells, and wherein each version of the transmitter circuit includes first and second branches with resistance that values affect a level of the output analog signal, the method further comprising selecting one or more of the cells to collectively determine the level of the output analog signal.

According to still another embodiment, a system is provided that includes a transmitter to transmit an output analog signal; and a transmitter circuit included in the transmitter and having a first branch and a second branch; wherein the first branch is selectively activated according to an input binary signal to send an output analog signal while the second branch is inactivated, and wherein the second branch is selectively activated according to the input binary signal to send the output analog signal while the first branch is inactivated; and wherein the output analog signal is converted from the input binary signal.

According to one embodiment of the system, current paths respectively through the first and second branches are in a crisscross arrangement.

According to one embodiment of the system, the first and second branches are formed in an integrated circuit.

According to one embodiment of the system, a level of current consumption by the transmitter circuit decreases if a level of the output analog voltage decreases.

According to one embodiment, the system further includes a receiver to receive the output analog signal transmitted by the transmitter.

FIG. 1 illustrates representations of a transmitter circuit 100 in accordance with one embodiment. The transmitter circuit 100 comprises a VMD-based push-pull source-series terminated (PPSST) transmitter in one embodiment, having an architecture that includes a first circuit branch 102 and a second circuit branch 104 coupled between a power supply (such as VCC) and ground. The first circuit branch 102 and the second circuit branch 104 are in a "crisscross" arrangement such that one circuit branch is active with current flowing through a resistor R2, while the other circuit branch is inactive with no current running therethrough.

Specifically in one embodiment, the first circuit branch 102 includes a resistor 106 (having a resistance value of R1/2 or one-half R1) coupled to the resistor R2, which in turn is coupled to a resistor 108 (also having a resistance value of R1/2). If the first circuit branch 102 is active and the second circuit branch 104 is inactive, a current I1 flows through the resistor 106 and then through the resistor R2 (shown as a current I2), and then through the resistor 108.

The second circuit branch 104 includes a resistor 110 (having a resistance value of R1/2) coupled to the resistor R2, which in turn is coupled to a resistor 112 (also having a resistance value of R1/2). If the second circuit branch 104 is active and the first circuit branch 102 is inactive, the current I1 flows through the resistor 110 and then through the resistor R2 (shown as a current I2), and then through the resistor 112.

The termination resistor Rrx at the receiver is represented (by broken lines) as being coupled in parallel to the resistor R2, and having a current Irx flowing there through. The receiver having the termination resistor Rrx can be located relatively near to the transmitter circuit 100, such as within the same circuit board, or may be located at a more geographically distant location, such as at an other end of a wired network.

A Thevenin equivalent circuit 114 is shown in FIG. 1, wherein the equivalent voltage Veq is coupled in series with a resistor 116 (having a resistance value of R1//R2) and the termination resistor Rrx. The value of Veq can be represented in this example embodiment as Veq=(VCC*R2)/(R1+R2). Thus, by changing the values of R1 and R2 in this equation, it is possible in one embodiment to change the voltage at the termination resistor Rrx, while also maintaining the output resistance of the transmitter circuit 100 equal to the termination resistor Rrx.

In the architecture represented in FIG. 1 and in comparison to conventional architectures discussed above wherein the two branches both carry current at the same time, only one branch (either the first branch 102 or the second branch 104) in the transmitter circuit 100 is active at any given time, thereby drastically reducing the current consumption during a DAC process to transmit a signal. For example, to produce an output of ½*VCC, the transmitter circuit 100 may use a current of 5 mA with Rrx=100 ohms, VCC=1 V, R1=100 ohms, and R2=infinity/high ohms, and if producing equalized and lower output voltage, much lesser current consumption may be provided. For example, to produce a lower output voltage of 1/30*VCC, the transmitter circuit 100 may provide values of R1=1500/1 ohms and R2=1500/14 ohms, which translates to a parallel resistance value of R1//R2=100, thereby providing a current consumption of 644.4 uA.

In one embodiment, wherein the transmitter circuit 100 is implemented using a 5-bit DAC, 2^N−2 output voltage levels (e.g., 30 different voltage levels) may be generated, with an average current consumption to produce all of the 30 levels being only 3.846 mA for example. Compared with the average power consumption of 8.330 mA of a conventional SST transmitter as previously discussed above, the transmitter circuit 100 of one embodiment can achieve the same output voltage amplitude(s) and approximate resolution (2^N−2 output voltage levels compared to 2^N−1 output voltage levels) but with less than half the average current consumption.

Figure 2:
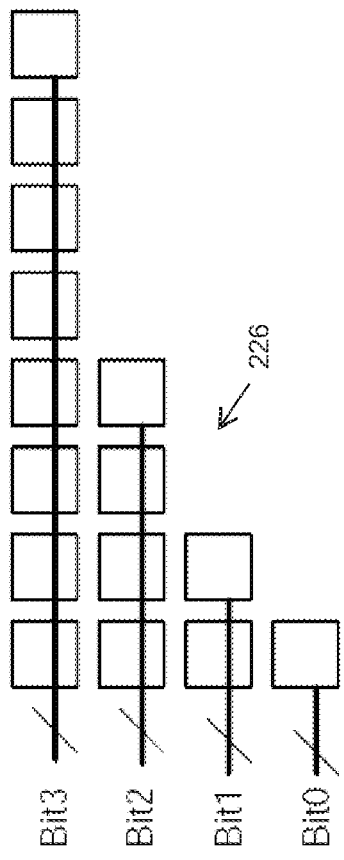
FIG. 2 illustrates a transmitter circuit of a unit cell of a plurality of unit cells in accordance with one embodiment.
Figure 2:
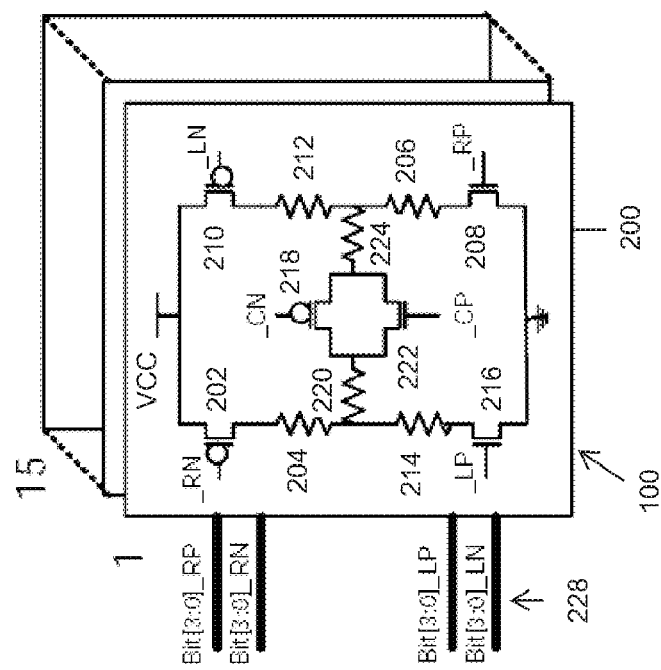

In one embodiment, complementary metal oxide semiconductor (CMOS) technology can be used to provide the switching between activation/deactivation of the first circuit branch 102 and the second circuit branch 104 when generating the output voltage (shown as the equivalent voltage Veq in FIG. 1). The various levels of the output voltage (e.g., the 30 different output voltage levels in the example provided above for a 5-bit DAC) can be generated by appropriately selecting the values of R1 and R2 located in multiple circuit legs (comprising combinations of CMOS transistors and resistors) of cells that are coupled in parallel and that are selectable according to an input binary code into the DAC. FIG. 2 illustrates such an example implementation.

FIG. 2 illustrates the transmitter circuit 100 of a unit cell 200 in accordance with one embodiment. There may be one or more unit cells 200 depending on the number of bits N of the DAC, with each unit cell 200 having a version of the transmitter circuit 100. The example shown in FIG. 2 is provided for a 5-bit DAC that receives in input binary sequence in signed form: SGN, BIT3, BIT2, BIT1, BIT0, where the most significant bit (MSB) represents the sign (SGN) or polarity of the value of the output voltage and the other bits represent the absolute value. Hence, the two extreme input binary values of the 5-bit DAC may be 1_1111 and 0_1111. In the case of the 5-bit DAC represented in FIG. 2, there are 15 unit cells 200, with each unit cell able to provide a positive and a negative version of its output voltage (voltages of opposite polarity), so that a total of 30 possible output voltages can be provided (2^5−2=30).

In the embodiment of FIG. 2, the resistance in each branch may be the sum of an ON/OFF resistance of a CMOS transistor plus the resistance of one or more resistors coupled thereto. Hence, in reading FIG. 1 in conjunction with FIG. 2 for the first branch 102: the resistor 106 having a value of R1/2 is provided by a turn-ON resistance of a first transistor 202 coupled in series with a first resistor 204, and the resistor 108 having a value of R1/2 is provided by a second resistor 206 coupled in series with a turn-ON resistance of a second transistor 208. Furthermore in reading FIG. 1 in conjunction with FIG. 2 for the second branch 104: the resistor 110 having a value of R1/2 is provided by a turn-ON resistance of a third transistor 210 coupled in series with a third resistor 212, and the resistor 112 having a value of R1/2 is provided by a fourth resistor 214 coupled in series with a turn-ON resistance of a fourth transistor 216. In one embodiment, the first transistor 202 may include a P-type MOS transistor (PMOS); the second transistor 208 may include a N-type MOS transistor (NMOS); the third transistor 210 may include a PMOS transistor; and the fourth transistor 216 may include a NMOS transistor.

The resistor R2, which may provide additional resistance value within the first branch 102 and the second branch 104, of one embodiment may be provided by at least one circuit element, such as through a series arrangement of a resistor 220, a turn-ON resistance of a PMOS transistor 218 coupled in parallel with a turn-ON resistance of a NMOS transistor 222, and a resistor 224. The values of the various resistors in each transmitter circuit 100 may be varied from one cell 200 to another cell 200, thereby enabling each of the cells 200 to provide different output voltages.

A diagram 226 represents the connection or other coupling of the 30 cells for the 5-bit DAC presented here by way of illustration.

As explained throughout herein, an embodiment of the transmitter circuit 100 provides an output voltage with a single active branch, rather than with two active branches in the same transmitter circuit 100. Hence, if the first branch 102 is active in any particular cell 200, the second branch 102 in that cell 200 is inactive, and vice versa, in a crisscross arrangement. Furthermore in one embodiment, the central resistor R2 is active only when neither the first branch 102 nor the second branch 104 are active, so as to preserve a relation of R1//R2=100 ohms.

According to one embodiment, the selection of (1) which branch in a particular cell to activate or deactivate, and (2) which one or more of the cells 200 to select to provide a particular one of the output voltage levels can be based on the input binary number/sequence/string/signal received by the DAC. The bit values of the bits of the input binary signal may themselves form the control signal(s) that are input into the control terminals (such as gate terminals) of the CMOS transistors shown in FIG. 2 and/or other values may be derived from the bit values of the input binary signal and the derived values in turn may be provided as the inputs to the control terminals of the CMOS transistors. The bit values and/or the derived values may be binary 1 or binary 0 values that activate or deactivate the various CMOS transistors shown, so as to provide the switching feature to activate one branch while another branch is deactivated.

As one example, the sign SGN of the MSB of the input binary sequence can be used in an embodiment to select one of the branches to activate, such as the first branch 102 is activated if the SGN is a binary 1 (and the second branch 104 is deactivated), and the second branch 104 is activated if the SGN is a binary 0 (and the first branch 102 is deactivated). Thus, the polarity of the input binary signal can be used in one embodiment to select the first branch 102 or the second branch 104.

The other bits of the input binary sequence may be used, alone or in combination with the SGN of the MSB, to select one or more of the cells 200 (having the activated and deactivated branches therein) to provide a particular one of the possible output voltages. Any appropriate logic or other methodology can be used for selection and activation of the various branches, transistors, cells, etc. and so the present disclosure is not limited solely to the logic/methodology disclosed herein. Such disclosed logic/methodology is provided herein for illustrative purposes to better understand operation of example embodiments.

In the particular embodiment depicted in FIG. 2, the transistor 202 receives a value or signal RN at its control terminal, the transistor 208 receives a value or signal RP at its control terminal, the transistor 210 receives a value or signal LN at its control terminal, the transistor 216 receives a value or signal LP at its control terminal, the transistor 218 receives a value or signal CN at its control terminal, and the transistor 222 receives a value or signal CP at its control terminal. The RN, RP, LP, and LN values in one embodiment may be derived from bit values of the input binary signal, and provided to the transmitter circuits 100 in the cells 200 via buses or lines 228.

For the 5-bit DAC example of FIG. 2, the following equations may be used to determine the values of control signals RN, RP, LP, LN, CP, and CN based on the sign SGN and bits 0-3 of the input binary sequence:

LP[X]=SGN ? BIT[X]: 1'b0
RP=SGN ? 1'b0: BITX
LN[X]=!LP[X]
RN[X]=!RP[X]
X=[3:0]
CP[X]=!LP[X] & !RP[X] (representing an inverse of LP with a logical AND to the inverse of RP)
CN[X]=!CP[X]

The equations above represent the following for LP and RP: If the sign bit is logic 1, LP[X] assumes the value of the BIT[X], otherwise assume the value of logic 0. Concurrently, if the sign bit is logic 1, RP[X] assumes the value of logic 0, otherwise assumes the value of BIT[X]. LN[X], RN[X], and CN[X] are the inverse (shown using the ! symbol) of LP[X], RP[X], and CP[X] respectively.

An example is provided herein for the 5-bit DAC, where the particular input binary sequence is 1_0011:

SGN=1; BIT[3]=0; BIT[2]=0; BIT[1]=1; BIT[0]=1;
LP[3]=0; LN[3]=1; RP[3]=0; RN[3]=1; CP[3]=1; CN[3]= 0;
LP[2]=0; LN[2]=1; RP[]=0; RN[2]=1; CP[3]=1; CN[]=0;
LP[1]=1; LN[1]=0; RP[1]=0; RN[1]=1; CP[3]=0; CN[1]= 1;
LP[0]=1; LN[0]=0; RP[0]=0; RN[0]=1; CP[3]=0; CN[0]= 1;

where LP[X]=1 and LN[X]=0 close the transistors 216 and 210 of each unit 200 respectively. LP[X]=0 and LN[X]=1 instead open the transistors 216 and 210. Consequently, the same consideration applies for RP[X], RN[X] for the transistors 208 and 202; and for CP[X], CN[X] for the transistors 222 and 218.

Assuming the values of the resistors 204, 206, 212, 214, 220, and 224 to be 750 ohms and the above equations, it is possible calculate the total output voltage of the transmitter 100 by reducing the resistor network by combining in parallel the 15 cells. In this example:

BIT[3] drives 8 cells equally as shown by 8 connected cells at 226, with each cell 200 having transistors 216 and 210 open, thereby resulting in no contribution for R1 (see FIG. 1) from resistors 212 and 214 in the second branch 104; transistors 208 and 202 open, thereby resulting in no contribution for R1 (see FIG. 1) from resistors 204 and 206 in the first branch 102; and transistors 218 and 212 close, thereby resulting in a contribution for R2 (see FIG. 1) of the parallel of 8 resistors 220 and 224 of (750+750)/8=187.5 ohms.

The consideration can be applied for BIT[2], BIT[1], and BIT[0]. Once the relative values of R1 and R2 are calculated for each BIT[X], the total output voltage value can be calculated by the equation for Veq in FIG. 1. In this example, BIT[2] has no contribution for R1 and 375 ohms for R2. BIT[1] provides 750 ohms for R1 and no contribution for R2, and finally BIT[0] provides 1500 ohms for R1 and no contribution for R2. The total contribution for R1 is the parallel of all the BIT[X] contribution, thereby providing a value of 500 ohms. For R2, the total parallel contribution is 125 ohms. Based on the equation for Veq shown in FIG. 1, the equivalent output resistance is the parallel resistance of R1 and R2 (100 ohms), and the output voltage Veq is VCC*0.2 (equal to 0.2 V) assuming VCC=1 V. Given any other bit combination for the input binary signal, various values of output voltage Veq can thus be achieved.

Figure 3:
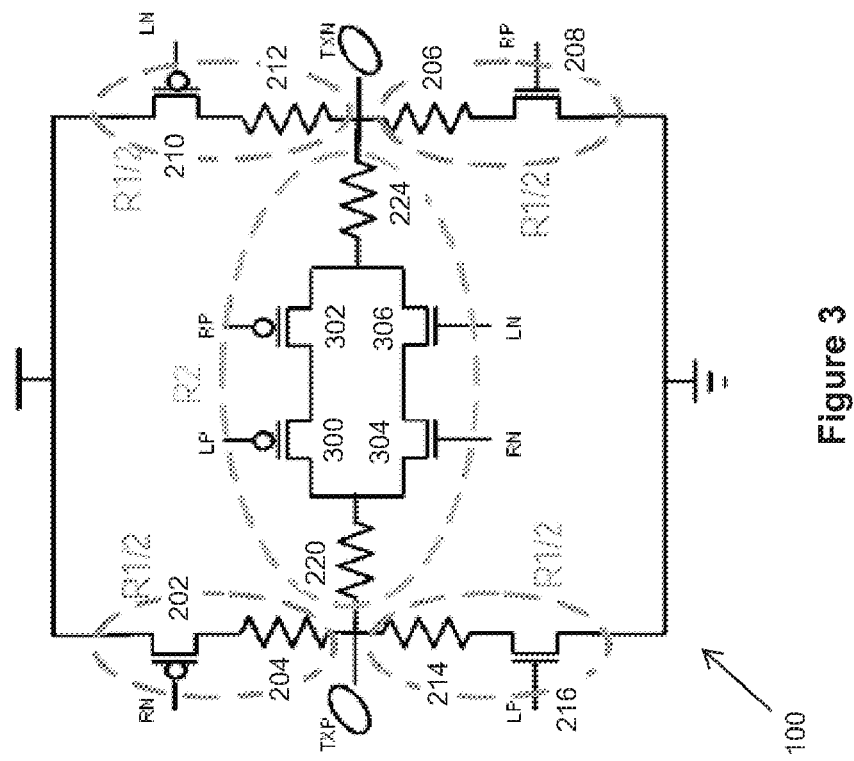
FIG. 3 illustrates a transmitter circuit in accordance with another embodiment.

FIG. 3 shows another embodiment of the transmitter circuit 100 for each cell 200. The embodiment of FIG. 3 is substantially similar to the embodiment of FIG. 2, except that the resistor R2 may be implemented as the resistor 220 and the resistor 224 coupled in series with a parallel arrangement of a PMOS transistor 300 in series with a PMOS transistor 302 and a NMOS transistor 304 in series with a NMOS transistor 306, with each transistor having a turn-ON resistance and a highly ohmic turn-OFF resistance. Nodes TXP and TXN represent common nodes between the cells 200.

In operation if the first branch 102 (see FIG. 1) is active, current flows (see FIG. 3) through an activated/ON PMOS transistor 202, the resistor 204, the resistor 220, activated/ON PMOS transistors 300 and 302 and NMOS transistors 304 and 306, the resistor 224, the resistor 206, and the activated/ON NMOS transistor 208. If the second branch 104 (see FIG. 1) is active, current flows (see FIG. 3) through an activated/ON PMOS transistor 210, the resistor 212, the resistor 224, activated/ON NMOS transistors 306 and 304 and PMOS transistors 302 and 300, the resistor 220, the resistor 214, and the activated/ON PMOS transistor 216.

Figure 4:
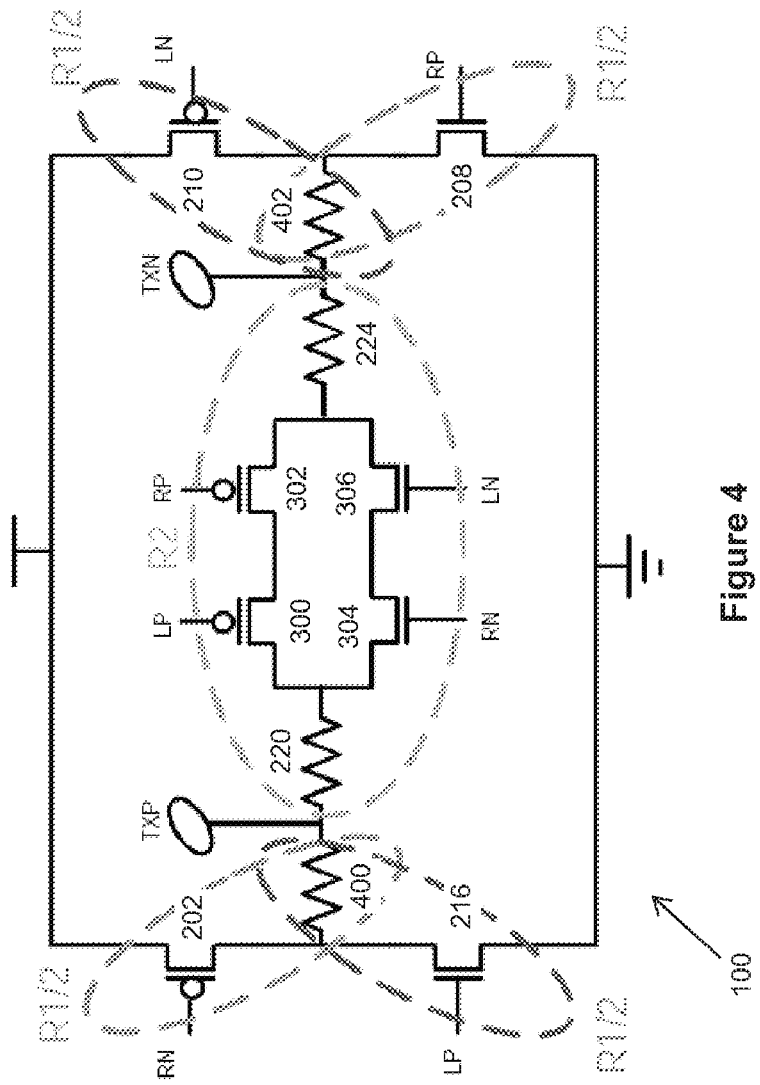
FIG. 4 illustrates a transmitter circuit in accordance with still another embodiment.

FIG. 4 illustrates the transmitter circuit 100 in accordance with still another embodiment. The embodiment of FIG. 4 has generally similar elements (identified using similar reference labels) as the embodiment of FIG. 3, except the embodiment of FIG. 4 includes "shared" resistors.

For instance in one embodiment, the upper leg of the first branch 102 may share a resistor 400 with a lower leg of the second branch 104. Similarly, the upper leg of the second branch 104 may share a resistor 402 with the lower leg of the first branch 102. With this arrangement, the same rise and fall times of output signals may be provided because the same physical resistors 400 and 402 are being used. Also, using the shared resistors negates or otherwise removes resistance variations that may occur due to process mismatch. Furthermore, real estate on an integrated circuit can be more efficiently utilized in view of the reduced number of components.

Figure 5:
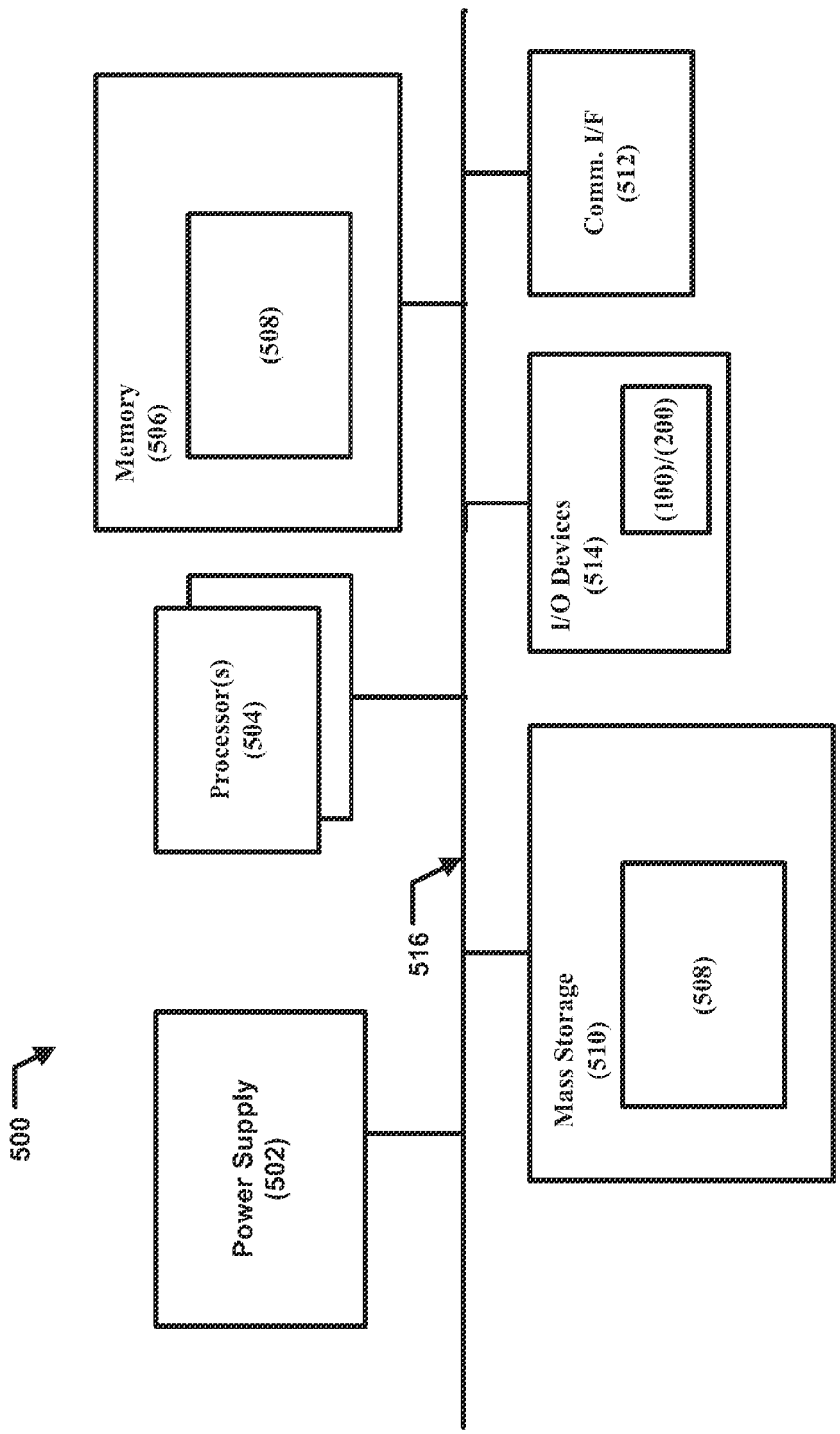
FIG. 5 is a block diagram that illustrates an example computer system suitable to practice the disclosed transmitter circuit and method of various embodiments.

Embodiments of the transmitter circuit(s) described herein may be used in a number of implementations and applications. For example, mobile devices, including but not limited to smart phones, nettops, tablets and other Mobile Internet Devices (MIDs), are designed with low-power circuitry. FIG. 5 is a block diagram that illustrates an example computer system 500 suitable to practice the disclosed transmitter circuit/method of various embodiments.

As shown, the computer system 500 may include a power supply unit 502, a number of processors or processor cores 504, a system memory 506 having processor-readable and processor-executable instructions 508 stored therein, a mass storage device 510 that may also store the instructions 508, and a communication interface 512. For the purpose of this application, including the claims, the terms "processor" and "processor cores" may be considered synonymous, unless the context clearly requires otherwise.

In various embodiments of the present disclosure, at least one of the processors 504 may generate or cause to be generated the input binary signal provided to the transmitter circuit 100.

The one or more mass storage devices 510 and/or the memory 506 may comprise a tangible, non-transitory computer-readable storage device (such as a diskette, hard drive, compact disc read only memory (CDROM), hardware storage unit, and so forth). The computer system 500 may also comprise input/output devices 514 (such as a keyboard, display screen, cursor control, and so forth). In various embodiments and purely by way of example, the I/O devices 514 may include the transmitter circuit 100 of each of the corresponding cell(s) 200. The transmitter circuit 100 and the corresponding cell(s) 200 may alternatively or additionally be located elsewhere in the computer system 500, and may comprise part or all of an integrated circuit.

The various elements of FIG. 5 may be coupled to each other via a system bus 516, which represents one or more buses. In the case of multiple buses, they may be bridged by one or more bus bridges (not shown). Data may pass through the system bus 516 through the I/O devices 514, for example, between the transmitter circuit 100 of the corresponding cell(s) 200 and the processors 504.

The system memory 506 and the mass storage device 510 may be employed to store a working copy and a permanent copy of the programming instructions implementing one or more operating systems, firmware modules or drivers, applications, and so forth, herein collectively denoted as 508. The permanent copy of the programming instructions may be placed into permanent storage in the factory, or in the field, through, for example, a distribution medium (not shown), such as a compact disc (CD), or through the communication interface 512 (from a distribution server (not shown)).

According to various embodiments, one or more of the depicted components of the system 400 and/or other element(s) may include a keyboard, LCD screen, non-volatile memory port, multiple antennas, graphics processor, application processor, speakers, or other associated mobile device elements, including a camera.

The remaining constitution of the various elements of the computer system 500 is known, and accordingly will not be further described in detail.

The above description of illustrated embodiments, including what is described in the Abstract, is not intended to be exhaustive or to be limited to the precise forms disclosed. While specific embodiments and examples are described herein for illustrative purposes, various modifications are possible. For example, the configuration and connection of certain elements in various embodiments have been described above in the context of high/low values of signals, responses to rising/falling edges of signals, inverters to invert signals, P-type and N-type transistors, and so forth. In other embodiments, different configurations can be provided in view of whether N-type transistors are used instead of P-type transistors, whether or not certain signals are inverted, whether certain changes in state are triggered in response to falling edges instead of rising edges or vice versa, and so forth.

These and other modifications can be made in light of the above detailed description. The terms used in the following claims should not be construed to be limited to the specific embodiments disclosed in the specification.

What is claimed is:

1. An apparatus, comprising:
   a transmitter circuit that includes a first branch and a second branch, the transmitter circuit to receive an input binary signal in a signed form including a polarity bit to represent a sign of a value of the input binary signal;
   wherein the first branch is activated to send an output analog signal while the second branch is inactivated, and wherein the second branch is activated to send the output analog signal while the first branch is inactivated; and wherein selection of the first branch or the second branch to activate to send the output analog signal is based on the polarity bit of the input binary signal received by the transmitter circuit, wherein the polarity bit of the input binary signal is a most significant bit of the input binary signal that controls a sign of an output voltage of the transmitter circuit, and wherein remaining bits of the input binary signal control an absolute value of the output voltage.

2. The apparatus of claim 1 wherein the transmitter circuit includes a voltage mode driver (VMD)-based push-pull source-series terminated transmitter.

3. The apparatus of claim 1 wherein the first branch includes a first resistance provided by a turn-ON resistance of a first transistor, a first resistor coupled to the first transistor, a turn-ON resistance of a second transistor, a second resistor coupled to the second transistor, and further includes a second resistance provided by at least one circuit element coupled to the first and second resistors.

4. The apparatus of claim 3 wherein the second branch includes the first resistance provided by a turn-ON resistance of a third transistor, a third resistor coupled to the third transistor, a turn-ON resistance of a fourth transistor, and a fourth resistor coupled to the fourth transistor.

5. The apparatus of claim 4 wherein the second branch further includes the second resistance provided by the at least one circuit element, which is also coupled to the third and fourth resistors.

6. The apparatus of claim 3 wherein a level of the output analog signal is based on the first resistance and the second resistance.

7. The apparatus of claim 4 wherein each of the first, second, third, and fourth transistors include a control terminal to receive a control signal to activate or deactivate the respective first, second, third and fourth transistors, and wherein the control signal has a value based on the values of the bits of the input binary signal.

8. The apparatus of claim 4 wherein the first and the third transistors include P-type metal oxide semiconductor transistors, and wherein the second and fourth transistors include N-type metal oxide semiconductor transistors.

9. The apparatus of claim 4 wherein the at least one circuit element includes at least one resistor coupled to at least one transistor, and wherein the at least one transistor includes a control terminal to receive a control signal to activate or deactivate the at least one transistor, and wherein the control signal has a value based on a relationship between control signals provided to control terminals of the first, second, third, and fourth transistors.

10. The apparatus of claim 1, further comprising a plurality of cells, wherein each of the cells includes a version of the transmitter circuit, wherein each version of the transmitter circuit includes first and second branches with resistance values, and wherein the resistance values in the cells collectively contribute to determine a level of the output analog signal.

11. The apparatus of claim 1 wherein at least one leg of the first branch shares a resistor with at least one leg of the second branch.

12. A method, comprising:

receiving, by a transmitter circuit, an input binary signal in a signed form including a polarity bit to represent a sign of a value of the input binary signal;

activating a first branch of the transmitter circuit to send an output analog signal while a second branch of the transmitter circuit is deactivated; and activating a second branch of the transmitter circuit to send the output analog signal while the first branch of the transmitter circuit is deactivated;

wherein selection of the first branch or the second branch to activate to send the output analog signal is based on the polarity bit of the input binary signal received by the transmitter circuit wherein the polarity bit of the input binary signal is a most significant bit of the input binary signal that controls a sign of an output voltage of the transmitter circuit, and wherein remaining bits of the input binary signal control an absolute value of the output voltage.

13. The method of claim 12, further comprising producing a level of the output analog signal according to first and second resistances in the first branch and the second branch, wherein:

the first branch includes the first resistance provided by a turn-ON resistance of a first transistor, a first resistor coupled to the first transistor, a turn-ON resistance of a second transistor, a second resistor coupled to the second transistor, and further includes the second resistance provided by at least one circuit element coupled to the first and second resistors; and the second branch includes the first resistance provided by a turn-ON resistance of a third transistor, a third resistor coupled to the third transistor, a turn-ON resistance of a fourth transistor, a fourth resistor coupled to the fourth transistor, and further includes the second resistance provided by the at least one circuit element, which is also coupled to the third and fourth resistors.

14. The method of claim 13, further comprising providing a control signal to each of the first, second, third and fourth transistors to activate or deactivate the respective first, second, third and fourth transistors, wherein the control signal has a value based on the values of the bits of the input binary signal.

15. The method of claim 13 wherein the at least one circuit element includes at least one resistor coupled to at least one transistor, the method further comprising providing a control signal to the at least one transistor to activate or deactivate the at least one transistor, wherein the control signal has a value based on a relationship between control signals provided to the first, second, third, and fourth transistors.

16. The method of claim 12 wherein a version of the transmitter circuit is provided in each of a plurality of cells, wherein each version of the transmitter circuit includes first and second branches with resistance values that affect a level of the output analog signal, the method further comprising selecting one or more of the cells to collectively determine the level of the output analog signal.

17. A system, comprising:

a transmitter to receive an input binary signal in a signed form including a polarity bit to represent a sign of a value of the input binary signal and to transmit an output analog signal; and a transmitter circuit included in the transmitter and having a first branch and a second branch;

wherein the first branch is selectively activated according to the polarity bit of the input binary signal to send an output analog signal while the second branch is inactivated, and wherein the second branch is selectively activated according to the polarity bit of the input binary signal to send the output analog signal while the first branch is inactivated; and wherein the output analog signal is converted from the input binary signal, wherein the polarity bit of the input binary signal is a most significant bit of the input binary signal that controls a sign of an output voltage of the transmitter circuit, and wherein remaining bits of the input binary signal control an absolute value of the output voltage.

18. The system of claim 17 wherein current paths respectively through the first and second branches are in a crisscross arrangement.

19. The system of claim 17 wherein the first and second branches are formed in an integrated circuit.

20. The system of claim 17 wherein a level of current consumption by the transmitter circuit decreases if a level of the output analog voltage decreases.

21. The system of claim 17, further comprising a receiver to receive the output analog signal transmitted by the transmitter.

* * * * *